United States Patent Office 3,471,603
Patented Oct. 7, 1969

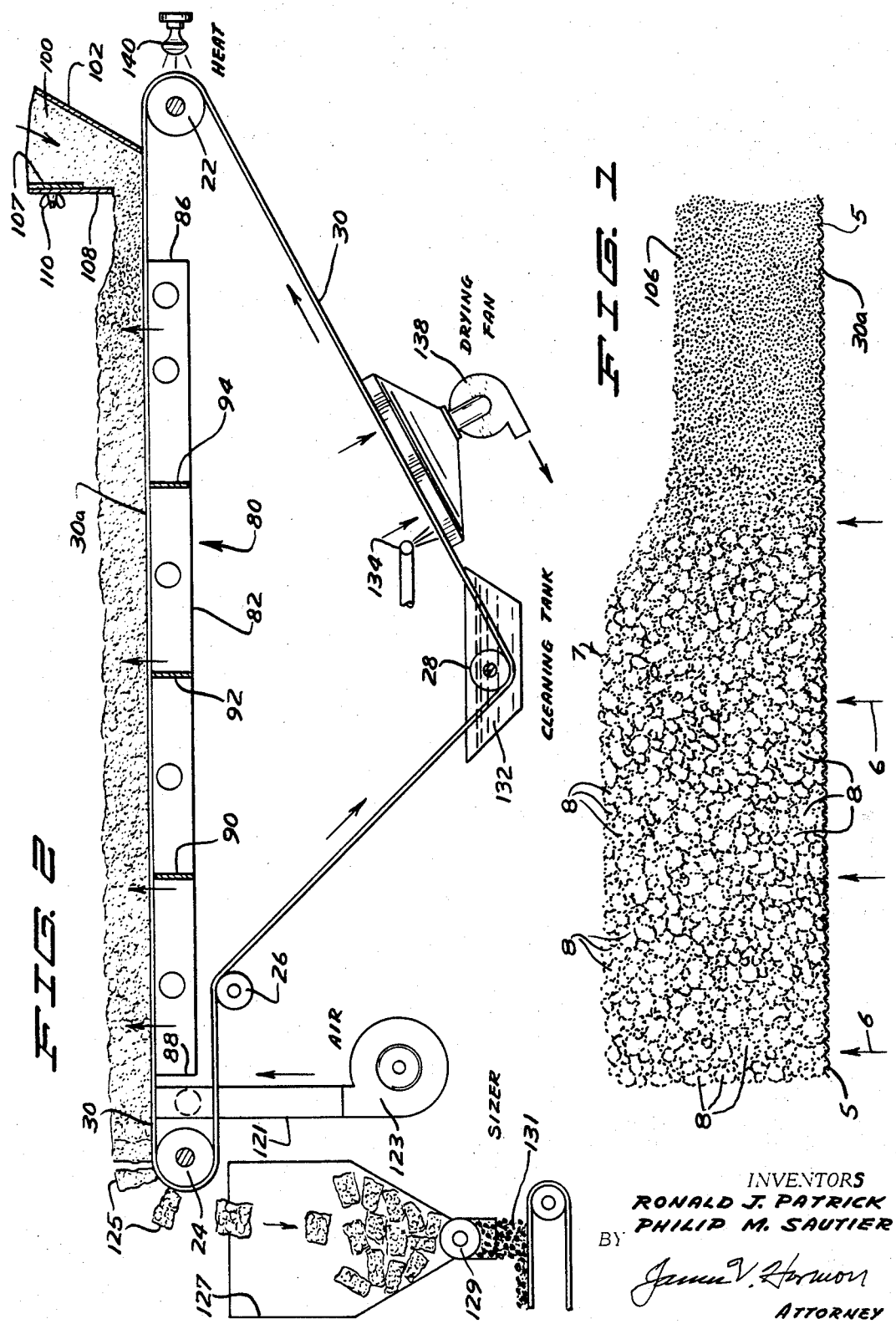

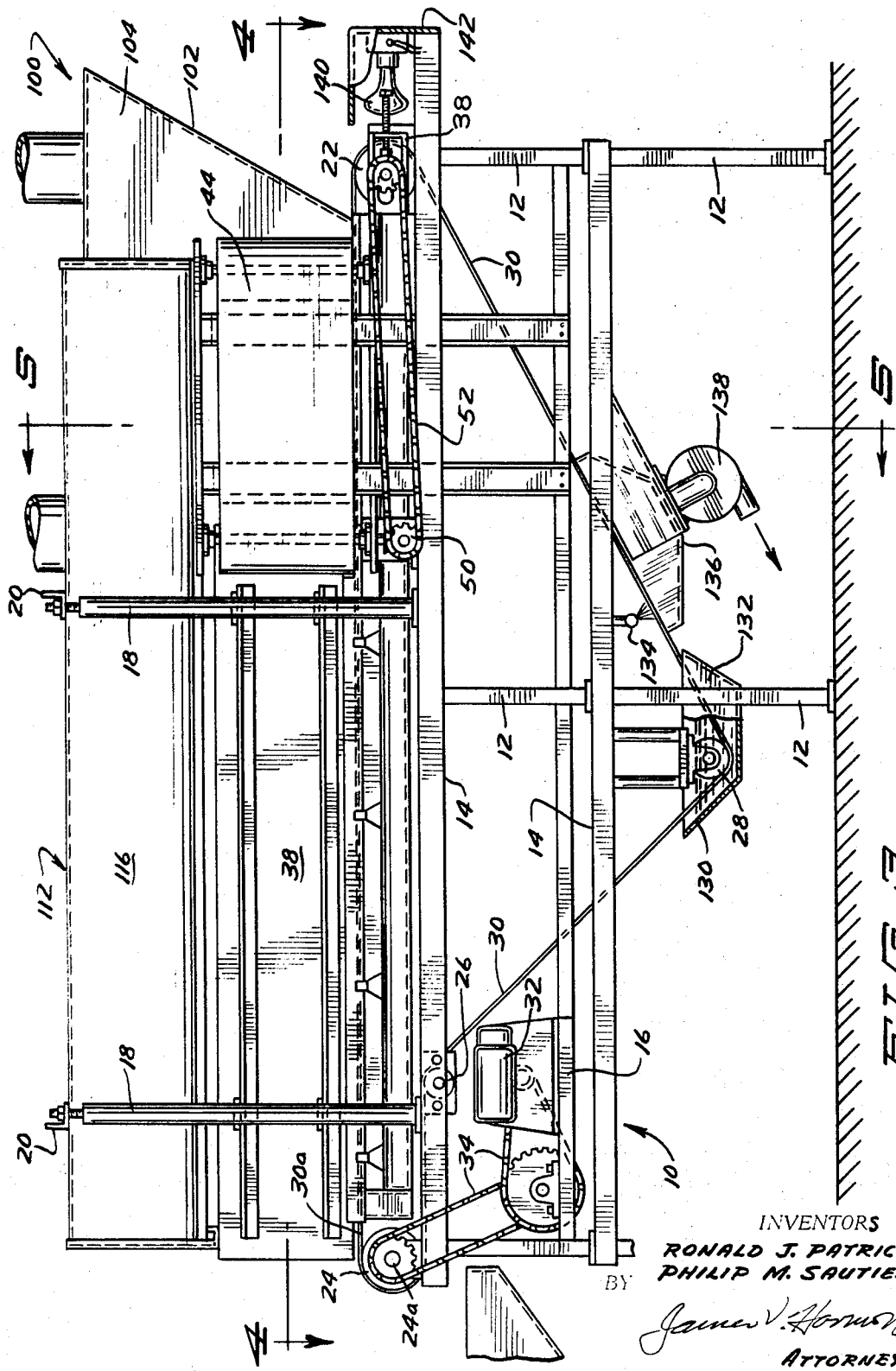

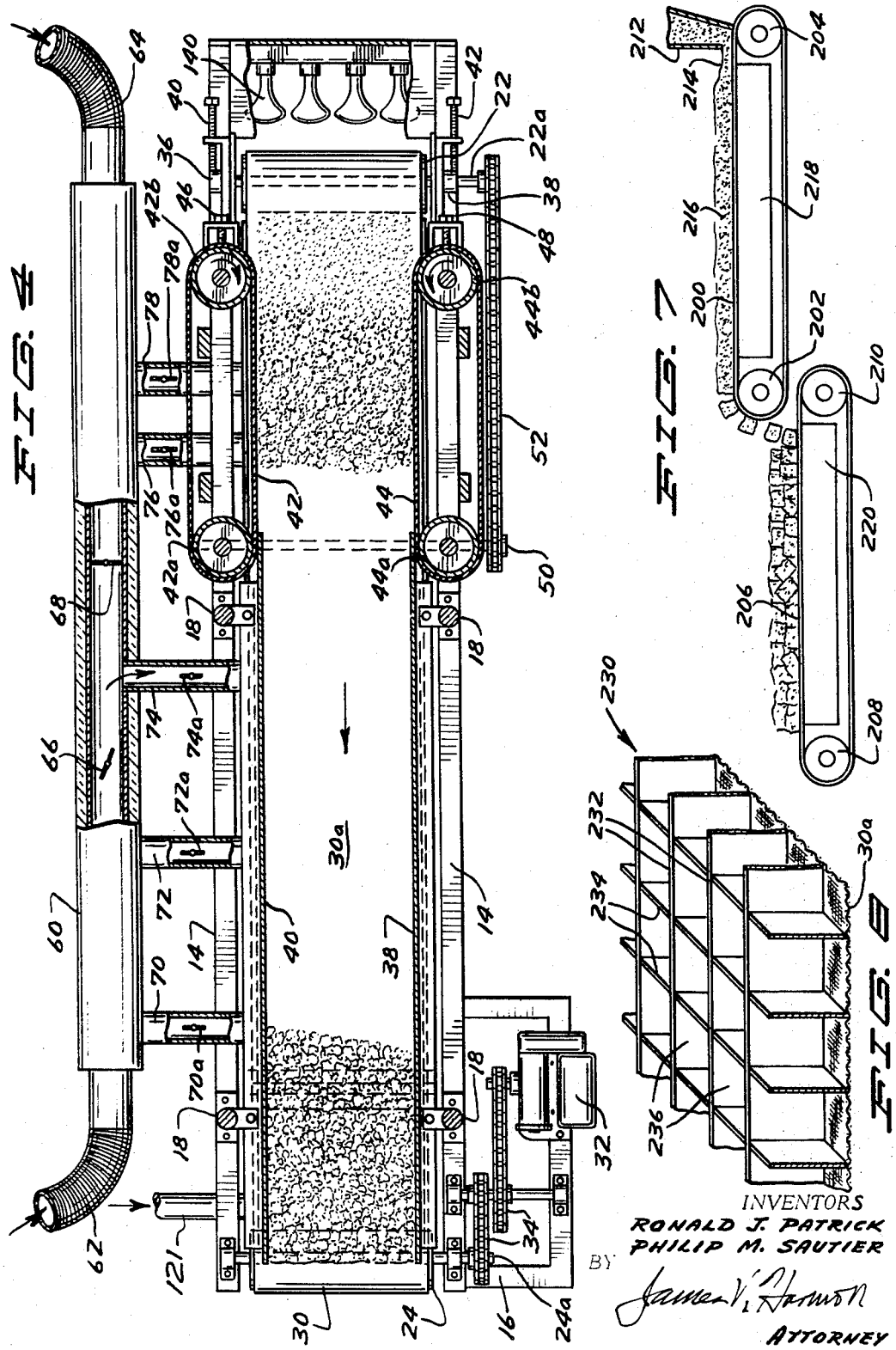

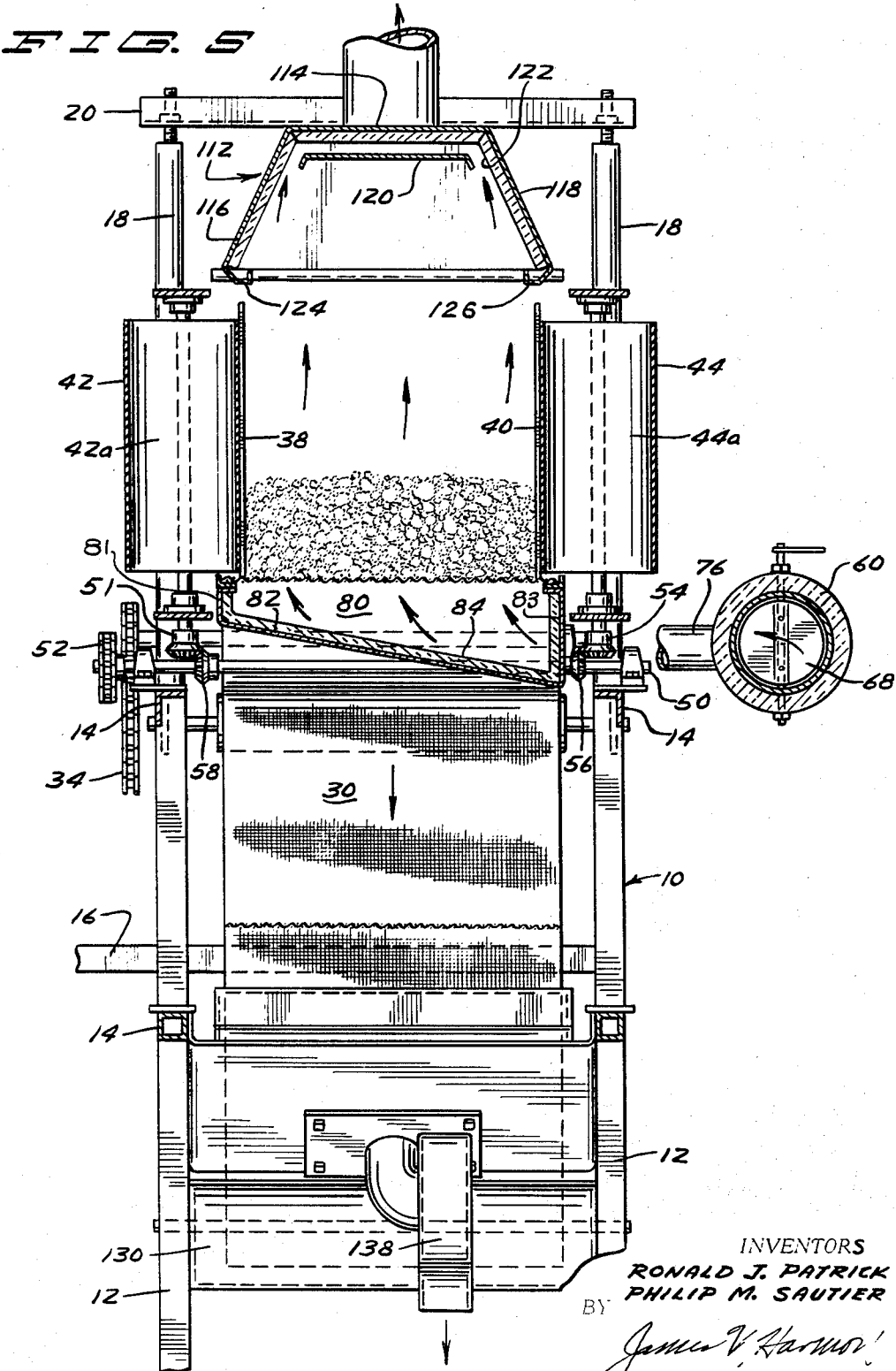

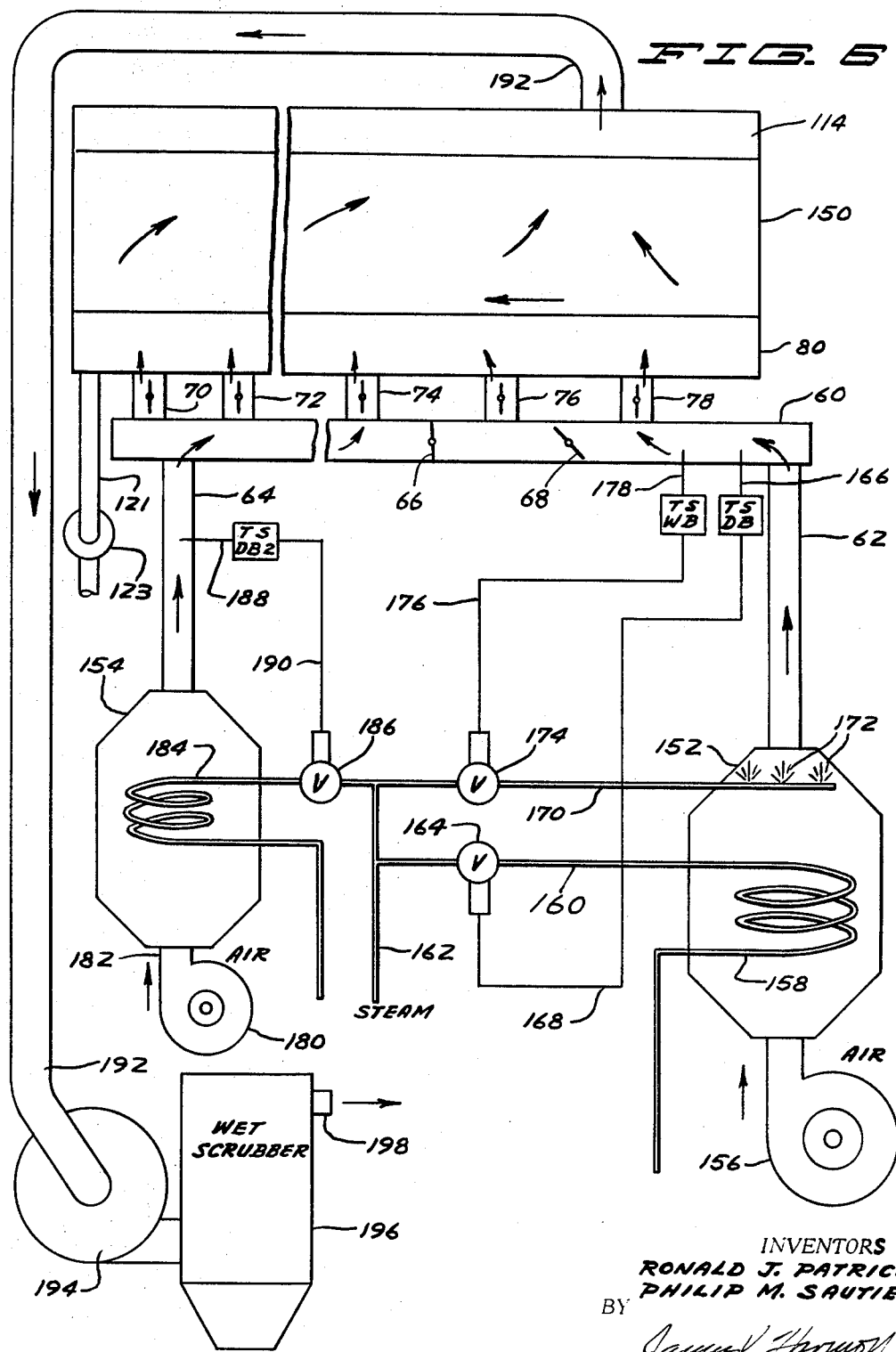

3,471,603
AGGLOMERATING PROCESS
Ronald J. Patrick and Philip M. Sautier, Minneapolis, Minn., assignors to The Pillsbury Company, Minneapolis, Minn., a corporation of Delaware
Filed Mar. 7, 1967, Ser. No. 621,195
Int. Cl. B29c 25/00
U.S. Cl. 264—118                                16 Claims

ABSTRACT OF THE DISCLOSURE

Method for agglomerating (forming porous clusters) particulate material by supporting them as a bed upon a screen, forcing an agglomerating gas such as heated moisture-containing air upwardly through the bed of particles to expand the bed and bond the particles together. The bonds are rigidified by forcing hot dry gas through the bed thereby form a highly porous, friable self-supporting mat. The mat is usually broken into pieces of the desired size.

---

The present invention relates to a process for treating pulverulent materials and more particularly to a method of forming porous agglomerates from particulate materials.

To successfully agglomerate pulverulent material such as powdered food materials, chemicals, minerals and the like, the strength of the agglomerates as well as their size and size distribution should fall within predetermined limits. It should also be possible to control the density and porosity of the finished product. The machine, moreover, should be able to run continuously for prolonged periods of time without interruption and should be capable of processing materials at suitable production rates.

Numerous agglomeration systems have been previously proposed. Among them is the process and apparatus described in the Gidlow Patent No. 3,220,054. In this apparatus an endless moving screen, either with or without impressed mechanical vibration is employed for carrying a bed of pulverulent material through an agglomerating zone defined by a stream of gas moving upwardly through the bed supported upon the moving screen.

This and other prior processes, while satisfactory for many applications, have certain deficiencies. One problem is the loss of material which is carried away in the stream of gas passing upwardly through the bed. Another problem is adhesion between the sides of the bed of the pulverulent material and the walls of the apparatus. Adhesion of this kind can, in some cases, cause the edges of the bed to break off or become lodged in the apparatus. A third problem encountered is that the finished product will usually have the same density as the bed when first formed. This condition is often undesirable since the initial bulk density of the bed is frequently higher than that desired in the finished product.

In view of these and other deficiencies of the prior art, it is one object of the present invention to provide an improved agglomerating process having the following advantages and capabilities: (a) the capability of forming a relatively large solid sheet or block of agglomerated material that is highly porous and contains a multiplicity of connecting channels and pores between bonded particles and is capable of being cut or otherwise broken and subdivided into pieces having any predetermined size; (b) a provision for expanding the bed of material during processing so that its volume is substantially greater than the initial volume of the bed whereby the bulk density of the finished product will be much less than that of the pulverulent material before agglomeration; (c) the ability to reliably agglomerate relatively large quantities of material to form an agglomerated block or mat having upper, lower and side surfaces defined by the supporting surfaces and walls of the apparatus; (d) the prevention of material from being carried away in the stream of agglomerating gas passing through the bed; (e) the provision of an apparatus and method of the type described which is rugged in construction, reliable in operation and can be produced and operated at a reasonable cost.

These and other more detailed and specific objects will become apparent in view of the following specification and claims and in the accompanying figures wherein:

FIGURE 1 is a semi-diagrammatic vertical longitudinal sectional view illustrating the principle of operation of a preferred form of the invention.

FIGURE 2 is a semi-diagrammatic side elevational view of one form of apparatus embodying the invention.

FIGURE 3 is a side elevational view of the apparatus illustrated diagrammatically in FIGURE 2.

FIGURE 4 is a horizontal sectional view taken on line 4—4 of FIGURE 3.

FIGURE 5 is a vertical sectional view taken on line 5—5 of FIGURE 3.

FIGURE 6 is a gas flow diagram of the apparatus of FIGURES 2–5.

FIGURE 7 is a semi-diagrammatic representation of a modified form of the invention including two serially associated conveyors.

FIGURE 8 is a perspective view of another modified form of the invention.

The invention will now be briefly described in connection with FIGURE 1. In accordance with the present invention a pulverulent material which is ordinarily moisture sensitive is placed on a foraminous supporting surface 5. The foraminous supporting surface is preferably but not necessarily moved in a horizontal plane. An agglomerating gas 6, e.g. vapor-gas, is forced upwardly through the material on the supporting surface with sufficient velocity to place the material in a turbulent condition and to expand the bed upwardly such that the expanded material resembles a foam 7. The particles making up the foam are then immobilized as they become bonded to one another at their points of contact. Often a plurality of relatively large vacuoles or pores 8 are distributed randomly through the mass of agglomerated material. Subsequently, the agglomerated mat is further rigidified, usually by drying and/or cooling it. The block of material thus formed is then broken or otherwise subdivided into pieces of a desired size. In one preferred apparatus embodying the invention, an edge guide is provided on each side of the bed. Each edge guide includes a provision which prevents the forward movement of the material in the bed from being retarded. In this manner, the structure of the bed is undisturbed while in a deformable condition.

In one modified form of the invention, the bed of material is agglomerated on a first foraminous endless belt and is then transferred to a second foraminous endless belt where it is exposed to additional drying and/or cooling gases.

In still another modified form of the invention, a removable molding grid is supported on the foraminous member. The grid is composed of a plurality of interconnected vertical walls defining cells within which the pulverulent material is deposited and rigidified. When the grid is removed, the agglomerates formed on the foraminous supporting surface retain the shape of the cells within which they are molded.

The process and apparatus can be used for the agglomeration of materials which tend to have plastic properties when exposed to high temperature or humidity or both but can also be used for hydrating pulverulent materials which have no tendency to become bonded together when subjected to these conditions. While the invention is adapted for use in agglomerating a variety of chemical and food materials, it is particularly well suited for agglomerating amorphous lactose and similar materials since it will allow the product to be wetted sufficiently to induce crystallization without producing agglomerates that have an undesirably high density and are difficult to handle. In the case of vibratory agglomerators, on the other hand, amorphous lactose when sufficiently wetted becomes formed into relatively large sticky masses which are sometimes deposited on exposed surfaces of the apparatus. This tendency for lactose to form sticky deposits makes it difficult to handle.

The pulverulent starting material can comprise either free-flowing powder or granular material. The term "powder" is defined as a pulverulent material having an average particle size of less than about 40 microns. Granules are defined as particles having an average size of greater than about 40 microns. There is no lower limit on the size of the particles to be agglomerated. The granules must, however, be sufficiently small in size so that they will be lifted by the rising agglomerating gases and are capable of being supported within the expanded mat. The term "pulverulent material" as employed herein is intended to include fibrous materials.

As a first step in the process, pulverulent material is deposited as a bed on a foraminous support 5. While the bed can vary greatly in thickness, a bed thickness of from about 1 inch to 1 foot is typical. The particles supported on the foraminous member must provide a bed of sufficient thickness so that agglomeration will produce a self-supporting bed.

The foraminous supporting surface 5 upon which the bed of pulverulent material rests is ordinarily divided into at least three zones. In the first of these zones the material being agglomerated is at rest. In the next zone it is subjected to treatment with an agglomerating gas at a sufficient temperature or humidity or both to convert the pulverulent material into a highly turbulent and subsequently plastic expanded condition. The gas velocity in the expansion zone is high enough to cause the material to boil upwardly such that its upper surface is raised substantially above the initial level of the bed. The thickness of the bed is usually increased by about 50% in this zone. Because of the multiplicity of cells formed in the mat and because of its initially turbulent condition which resembles boiling, the mat often has an appearance similar to a foam and can be thought of as a foam-like structure.

The upward movement of gas causes the particles to be agitated. As they begin to adhere to one another, a porous, bubble-like structure is formed in which a multiplicity of open pores or vessels are randomly distributed through the semi-stable immobilized but deformable agglomerated mass. This foamed, expanded material is then rigidified as described above. As the material in the expansion zone becomes heated, the moisture or other volatile liquid condensed on the exposed surfaces of the particles is lost.

In the course of developing the invention, it was discovered that the lower surface of the agglomerate will frequently become bonded to the foraminous support owing to the relatively high humidity and temperature in this portion of the bed. The adhesion of the bed to the belt was found to be a substantial advantage in preventing the rising gases from carrying away unagglomerated particles.

The length of the expansion zone can vary greatly depending upon the degree of hydration desired and the time, if any, required for crystallization as well as upon other factors. In general, however, where greater exposure times are necessary for producing sufficient adhesion between the particles to cause them to bond together, the zone should be increased in length. On the other hand, where the material is extremely sensitive to the agglomerating atmosphere this zone can be reduced in length. In a typical application, the length of the zone may be from about 1 foot to about 10 feet in length.

Any gas which is capable of modifying the surfaces of pulverulent material so as to render them tacky is suitable as an agglomerating atmosphere. The agglomerating atmosphere can comprise either a mixture of vapor and air (vapor-gas), air or other gas by itself or a vapor by itself depending upon the requirements of the specific material being agglomerated. The agglomerating atmosphere can also consist of heated gases either with or without added moisture or other condensible liquid. In the event heated gases alone are used, agglomeration can be accomplished by incipient thermal fusion of the pulverulent material. The vapor can comprise moisture vapor or vapor from other condensible liquid such as a non-polar solvent. For convenience, the gas used for bonding the particles together will hereinafter be referred to simply as "agglomerating gas" or "agglomerating atmosphere."

The temperature of the agglomerating gas can be varied considerably when moisture is depended upon for agglomeration. The temperature of the agglomerating gas can even be below ambient temperatures. On the other hand, when incipient thermal fusion is used temperatures should be substantially above room temperature. When a vapor-containing agglomerating gas is employed, the temperature of the agglomerating gas will generally be between 70° F. and 800° F. with a range of from about 150° F. to about 400° F. being typical. The relative humidity of the gas can also be varied depending upon the type of feed system employed, it being understood that at relatively high temperatures lower humidity levels will usually be used and at lower temperatures a greater humidity level is often required to produce the same degree of agglomeration. In general, however, with products which have been evaluated thus far, humidity values from about 20 to near 100% have been found suitable. The velocity of the agglomerating gas is used to control the density of the finished product. In the case of materials with which tests have run, an air velocity from about 200–600 feet per minute through the foraminous supporting surface and material which it supports is typical.

In the next treatment zone, the temperature and humidity are maintained at appropriate values for rigidifying the expanded agglomerate by drying, cooling, freezing or a combination thereof to remove the tacky surface layer thereby rigidifying the expanded foam-like mat. This renders the mat substantially self-supporting. Rigidification is usually accomplished by forcing a gas through the bed.

During the last stages of the process, the screen and adhered mat are preferably carried through a final treatment zone where a suitable cooling medium such as cool air acts to lift the agglomerated block of material away from the screen and render it friable. In the cooling zone, the air present in the cells is cooled thereby condensing the moisture (or the vapor) remaining in the trapped air on the surface of the agglomerated particles. This maintains the exterior of the agglomerate in a dry condition while the pores thereselves have a final moisture content that can be reliably controlled by the velocity, temperature and humidity of the drying and cooling air and the time period during which drying and cooling are performed.

Refer now to FIGURES 2–5 which illustrate by way of example one preferred form of apparatus embodying the invention. As shown in the figures, the apparatus includes a supporting framework 10 composed of posts 12 to which a plurality of horizontally disposed beams 14 are rigidly secured in any suitable manner as by welding. An auxiliary framework 16 is mounted on one side of the apparatus for supporting the drive mechanism shown in FIGURES 3 and 4. Extending upwardly from the uppermost beam 14 are four vertically disposed risers 18 having horizontally disposed cross members 20 connected between their upward ends.

Journalled for rotation upon the framework 10 are four transversely disposed parallel rolls designated 22, 24, 26 and 28 about which is entrained an endless foraminous supporting member or belt 30. The belt in this instance consists of a woven stainless steel screen of a commercially available grade. The belt 30 includes a horizontally disposed supporting section designated 30a. Motion is imparted to the belt 30 by the provision of a suitable drive motor 32 supported on the framework 16 and connected to roll 24 by a transmission including drive chains 34 which connect motor 32 to the shaft 24a of roll 24. While the speed of the belt 30 is not critical, it was found that satisfactory operation could be obtained with a variety of products when the belt travels at speeds of from about 1 inch to 10 feet per minute. A speed of from about 6 inches to about 6 feet per minute is typical.

As shown in FIGURES 3 and 4, the journals 36 and 39 of the roll 22 are mounted for longitudinal sliding movement and are suitably coupled to the framework by adjustable fasteners such as screws 41 and 43 respectively for changing the tension of the belt 30. It will be understood that before operation is begun, the roll 22 should be moved toward the right as seen in the figures until the belt appears tight.

Supported upon the framework 10 and specifically upon risers 18 in alignment with approximately the last ⅔ of the belt section 30a and located immediately above this section of the belt are two longitudinally extending, vertically disposed and parallel edge dams composed of flat plates 38 and 40. The dams are positioned a slight distance centrally of the side edges of the belt 30. The dams function to prevent the product from spilling over the side edges of the belt and also form an enclosure to contain rising gases.

Positioned upstream of the edge dams 38 and 40 and in alignment with them are a pair of laterally spaced edge guides composed of endless belts 42 and 44. In this case the belts 42 and 44 are formed from a suitable flexible material such as rubber entrained over vertically disposed, longitudinally spaced rolls 42a and 42b and 44a and 44b, respectively. The latter two rolls are suitably journalled for rotation upon the supporting framework 10 and the journals of rolls 42b and 44b are supported for longitudinal sliding movement such that their position can be adjusted by belt tension regulating bolts 46 and 48.

As can be seen in FIGURES 3 and 4, the shaft 22a of roll 22 is connected to a drive shaft 50 by roller chain 52 entrained over sprockets on each shaft. Bevel gears 51 and 54 associated with the rolls 42a and 44a are engaged with cooperating bevel gears 58 and 56 respectively on the shaft 50 as seen in FIGURE 5. In this way, power is transmitted from the roll 22 to shaft 50 and through the mating bevel gears to the rolls 42a and 44a thereby driving the belts 42 and 44 so that the inner reach of each of the belts travels at the same speed and in the same direction as the belt section 30a. In this way the belts 42 and 44 serve as guides to prevent retardation of the forward movement of the material being agglomerated while the bed is in a deformable condition.

Agglomerating, drying and/or cooling gases are introduced to the agglomerator from a suitable source such as a gas supply manifold 60 (FIGURES 4 and 5) having inlet ducts 62 and 64 at each end and including manually adjustable shut-off valves 66 and 68 and a plurality of longitudinally spaced gas supply ducts 70, 72, 74, 76 and 78, all of which communicate with a gas supply plenum 80 underlying belt 30 and defined by vertically disposed side walls 81 and 83, inclined bottom wall 82 and end walls 86 and 88 (FIGURE 2). The plenum is preferably insulated by a layer of insulating material 84 located on its inward surface. Partitions 90, 92 and 94 are provided within the plenum 80 between adjacent supply ducts. As can be seen in FIGURE 4, the ducts are provided with flow control butterfly valves 70a, 72a, 74a, 76a and 78a respectively so that the flow of gas into each section of the plenum 80 can be accurately controlled. Thus, by appropriate positioning of the various valves, the gas supply to the plenum can be changed to suit the requirements of the product being treated. Agglomerating and drying zones can be changed as desired by varying the settings of valves 66 and 68 (FIGURES 4 and 6). Thus, by opening valve 66 and closing valve 68 as shown in FIGURE 4, drying gas will be admitted through lines 70, 72 and 74 while an agglomerating gas will be introduced through lines 76 and 78. Accordingly, the agglomerating zone of the apparatus will then be located between the end wall 86 and partition 94. The drying zone will extend from end wall 88 to partition 94. In the event butterfly valve 68 is opened and 66 closed, the agglomerating zone will extend from wall 86 to partition 92. The drying zone will extend from partition 92 to wall 88. In general, it should be understood that the agglomerating zone need only be long enough to enable the proper degree of exposure of the pulverulent material to the agglomerating atmosphere at the particular belt speed selected. Similarly, the drying zone must be of sufficient length to remove residual stickiness from the newly formed agglomerate.

The pulverulent material that is to be agglomerated is fed to the agglomerator from a hopper 100 (FIGURES 2 and 3) having an inclined front wall 102, side walls 104 (only one of which is shown) and a rear wall 107, the bottom portion of which comprises a vertically movable baffle consisting of a plate 108 that can be locked in any selected position by means of a suitable retainer such as wing-nut 110 (FIGURE 2).

Supported upon the rises 18 and cross members 20 is a hood 112 which includes a horizontally disposed top section 114, downwardly and outwardly inclined side portions 116 and 118 and a horizontally disposed baffle 120 spaced slightly below the upper surface of the hood for evenly distributing the gases drawn into the hood along its sides and throughout its length. Insulating material 122 is preferably provided on the inside surface of the hood 112. Gutters 124 and 126 are provided along its lower edge for collecting condensed moisture and allowing it to be withdrawn and disposed of.

As seen in FIGURES 2 and 3, a cleaning tank 130 is optionally positioned around the roll 28. During operation, the belt 30 passes through a cleaning fluid 132 provided within the tank 130. The cleaning fluid will usually be water.

The belt 30 travels from the cleaning tank 130 to a station in which water or other liquid such as a biocide is sprayed onto the belt 30 from a spray head 134. On the opposite side of the belt 30 from spray head 134 is a chamber 136 communicating with a suction fan 138. The chamber 136 is opened on the side adjacent the belt 30 and the fan 138 is driven in the proper direction to draw air downwardly through the belt 30 to thereby dry the belt as it travels upwardly. Any residual moisture present on the belt is evaporated by heating the belt, for example with heat lamps 140 supported upon a bracket 142 adjacent the roll 22. It was also found that by heating the belt 30 just prior to exposure to the agglomerating atmosphere, condensation of moisture on the belt 30 is avoided.

Referring again to FIGURES 1 and 2, it will be seen that the thickness of the bed of pulverulent material initially formed is established by plate 108 and is substantially constant. The particles forming the bed are initially relatively close together and the bed has the same bulk density as the product normally has when in a resting condition. The movement of the belt section 30a carries the bed toward the left as seen in the figures over the plenum 80. As soon as the bed is exposed to the upward flow of gases through the belt section 30a, the bed will begin to expand upwardly and a multiplicity of cells or openings 8 (FIGURE 1) will be formed between the particles thus resulting in an increase in thickness of about 50%. Simultaneously, agglomeration will take place as described in more detail above. It should be understood that when a product having a higher bulk density is required, the velocity of the gases introduced through ducts 76 and 78 should be decreased. If the bulk density is to be decreased, the gas velocity should be increased. When the particles become bonded together, bonds will also form between the belt 30 and the overlying expanded agglomerate.

The speed of the belt 30 is determined largely by the exposure time required for proper treatment. Where hydration should be carried out for a longer period of time, the belt speed should be decreased. Correspondingly, where shorter treatment times are desired, the belt speeds should be increased. An important advantage of the invention derives from the precision with which the exposure time can be controlled. Furthermore, since relatively high levels of humidity can be employed, it is possible to obtain adequate hydration where in prior equipment it was sometimes impossible to handle the material at relatively high levels of humidity.

As the foraminous supporting surface continues to move the expanded bed toward the left, the bonds between the contacting particles will become stronger. The agglomerated mat originally produced will often be somewhat deformable. In order to help rigidify it and assist in releasing it from the belt section 30a, unheated air is preferably introduced from beneath the belt through a duct 121 (FIGURE 2) connected to a blower 123 through which atmospheric or refrigerated air is introduced. The gas supplied through duct 121 was found surprisingly effective in both rigidifying the mat formed on the screen as well as releasing it from the screen. As can be seen in FIGURE 2, the agglomerated material in passing over the roll 24 breaks into pieces 125 which fall into a hopper 127 communicating with a sizer 129. The sizer can comprise any of a variety of commercially available machines designed to cut, saw, grind or otherwise subdivide the pieces 125 to the desired size. In the event a flowable product is desired, particles 131 of a relatively small size are formed.

Refer now to FIGURE 6 which illustrates a preferred gas circulation system in accordance with the invention. As seen in the figure, gas is introduced to the manifold 60 through ducts 62 and 64 which are connected to heaters 152 and 154 respectively. The heater 152 consists of a chamber into which air is forced by a blower 156. Within the enclosure is a heat exchanger 158 of any suitable known construction. In this instance, the heat exchanger 158 is supplied with steam from ducts 160 and 162, the flow of steam being controlled by a conventional flow control valve 164 of the type which can be regulated from a remote point, in this instance by a temperature-sensing dry bulb thermometer 166 coupled to the valve 164 by means of a conductor 168. Valve 164 can be operated by any suitable power source such as electric or pneumatic power in which case appropriate transducers are provided between thermometer 166 and the valve 164. During operation, if the temperature sensed by thermometer 166 in the manifold 60 falls below a predetermined value, the valve 164 will be opened thereby supplying more heat to the heat exchanger 158. If the temperature in manifold 60 becomes too great, the valve 164 will move toward the closed position.

A portion of the steam provided by steam line 162 passes through steam line 170 into the heater 152 and is expelled through nozzles 172. The flow through steam line 170 is controlled by means of a conventional remotely controlled valve 174 similar to valve 164 which is regulated by a wet bulb thermometer 178 positioned to sense the temperature within manifold 60 and connected to the valve 174 in a suitable manner as by a conductor 176. In operation, when the wet bulb temperature falls below a predetermined level, the valve 174 will open thereby increasing the rate at which steam is expelled through nozzle 172 and in turn increasing the humidity of the agglomerating atmosphere supplied to the manifold 60 through duct 62.

The air introduced into the heater 154 is supplied by a conventional blower 180 through a duct 182 communicating with the heated material. Heat is supplied by the provision of a heat exchanger 184 into which steam is introduced from steam line 162 through a valve 186 that is similar in construction to the valves 164 and 174. The valve 186 is controlled by a dry bulb thermometer 188 suitably coupled to the valve 186, for example by means of a conductor 190. The valve 186 is arranged to open when the temperature sensed by the thermometer 188 falls below a predetermined level and to close when a predetermined temperature is exceeded.

In FIGURE 6 it will also be seen that gases are withdrawn from the hood 114 through a steam line 192 communicating with a blower 194 which forces the gases as well as any entrained particulate material into a wet scrubber 196 for the purpose of removing gas suspended particles. The cleaned air is expelled through an outlet 198. The agglomerating atmosphere introduced through line 62 and manifold 60 will, with the valve 66 in the closed position as shown and valve 68 in the open position, enter the agglomerator through lines 70 and 72, will pass through the material being agglomerated and will be exhausted through line 192. The drying gas introduced through line 64 will enter the agglomerator through line 74, 76 and 78 and will be exhausted through line 192 as will the cooling gas introduced through line 121. As explained above, when valve 68 is closed and valve 66 is opened dry gas rather than agglomerating gas will be introduced through line 72. It will be understood that a small fraction of agglomerating and drying gases will escape into the atmosphere without adverse effect.

Refer now to FIGURE 7 illustrating a modified form of the present invention. In this embodiment, a foraminous supporting surface is divided into two separate endless foraminous belts including a first belt 200 entrained over longitudinally spaced parallel driven rolls 202 and 204 and a second belt 206 entrained over rolls 208 and 210 which are driven in the same direction as rolls 202 and 204 so that the upper portion of each of the belts travels from right to left as seen in the figure.

Pulverulent material that is to be agglomerated is supplied from a hopper 212 similar to the hopper 100. The material introduced to the foraminous supporting surface defined by belt 200 forms a bed of pulverulent material 214 which is expanded and agglomerated at 216 by heated and/or humidified gas introduced throug a plenum 218 on the lower side of the belt substantially as described above in connection with FIGURES 1–6. In this modified form of the invention, the block or mat of material initially formed breaks apart as it passes over the roll 202 and falls onto the belt 206 in the form of chunks or pieces of various sizes. A drying gas is introduced through belt 206 from a plenum 220 positioned beneath it. Heated relatively dry air will ordinarily be employed for this purpose. The apparatus is preferably operated with the belt 206 running substantially slower than the belt 200. The depth of the bed of agglomerated pieces on belt 206 will therefore be somewhat greater than that on the belt 200. By employing two separate belts as shown, the material being agglomerated can be initially exposed to agglomerating gases of different compositions in rapid succession with the belt 200 running at a relatively high speed. At the same time, the belt 206 owing to its much slower speed will subject the agglomerated pieces to a treating atmosphere over an extended period of time. This form of the invention is therefore particularly useful in treating products that require subsequent conditioning such as gradual drying, cooling or hydration over a prolonged period of time.

A variety of other treating materials can be applied to or passed through them at after it has been formed. These include materials such as fragrances, coloring, taste modifying substances, or a surface coating layer such as an icing or the like. Such materials can be applied by spraying, doctoring, etc. or by forcing them upwardly through the mat, e.g. from plenum 220. Some of the further treatments that can be performed are: ammonia treatment, oxidation, cryogenic treatment, solvent extraction, treatment with alcohols, esters, ethers, oils and shortenings. Various non-solution chemical reactions can be carried out, e.g.

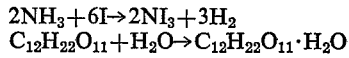

$$2NH_3 + 6I \rightarrow 2NI_3 + 3H_2$$
$$C_{12}H_{22}O_{11} + H_2O \rightarrow C_{12}H_{22}O_{11} \cdot H_2O$$

etc.

Refer now to FIGURE 8 which illustrates a modified form of the invention. In this form of the invention, a molding grid 230 formed from a plurality of connected vertically disposed plates including longitudinally extending plates 232 and transversely extending plates 234 defines cells 236 which are open at the top and bottom. A plurality of these molding grids are placed upon the belt section 30a and are carried with it during the agglomerating process. As the operation proceeds, the cells 236 are either partially or completely filled with the pulverulent material that is to be agglomerated. Agglomeration then takes place as described above in each of the cells 236. After the material is agglomerated, the molding grid 230 is removed and the pieces of agglomerated material are removed from the cells 236. Each piece bears the shape of the cell from which it was removed. In this manner, novel materials, such as foods, having predetermined defined shapes can be readily prepared. The shapes formed can be geometric as triangular, rectangular, hexagonal, but can also resemble naturally occurring food products, as for example a beefsteak, a pork chop, etc.

In another modified form of the invention the longitudinally extending plates 232 are provided on the side edegs of the foraminous supporting member 30 only and the transversally extending plates 234 are eliminated. Plates 232 are in this case secured to the belt itself and function as edge dams or guides which replace the guides 38, 40, 42 and 44 of FIGURE 4.

In still a further modified form of the invention a foraminous member such as a woven metal screen (not shown) is placed on the upper surface of the grid 230 for the purpose of preventing undesired loss of the product being agglomerated in the rising stream of agglomerating and drying gases. This screen can be secured to the grid in any suitable manner as by welding.

The advantages of the invention are numerous. As a result of the adhesion between the expanded mat and the belt section 30a, the loss of particles entrained in the rising stream of gases is minimized. Moreover, since the material resting on the belt section 30a is initially fluid and subsequently becomes rigid, the chance for product loss in the air stream is reduced even further. It is also possible with the present invention to form a solid sheet or block which can be divided, if desired, into pieces or sections of any selected size or shape. Additionally, moving guides defined by the belts 42 and 44 prevent the sides of the agglomerated and expanded mat from being retarded while in a deformable condition thereby avoiding any possibility that the mat will be broken or otherwise damaged. The invention also makes possible the production of expanded agglomerates having a controlled bulk density.

Although prior equipment of the general type described is usable, it is severely limited with regard to the amount of moisture that can be present in the agglomerating atmosphere. With the present invention, on the other hand, when steam is employed it is possible to use a relatively high ratio of steam to air. In fact, it is possible to completely interrupt the air supply and to introduce undiluted steam to the agglomerator through manifold 60. This advantage is due primarily to the fact that adhesion of pulverulent material to the belt will not adversely affect the operation.

While the invention has been described hereinabove for use in agglomerating pulverulent materials, it is understood that it has application for hydrating or otherwise treating materials which have no tendency to become tacky when exposed to an agglomerating atmosphere composed of either vapor or high temperature gases. In this application, the finished material will, of course, not need to be subdivided after treatment.

The invention also has utility for drying and agglomerating slurries. In this application a slurry (a liquid containing dispersed solids) is pumped or otherwise fed to the inlet end of the foraminous screen section 30a and is deposited upon the upper surface of the screen in the place which has been occupied by the pulverulent bed described in the previous forms of the invention. The liquid slurry will form a layer on the screen section 30a having a depth of from a fraction of an inch to several inches. The liquid layer is prevented from running off of the screen by the edge dams and by the front wall of the hopper. As the screen moves from right to left the slurry will be carried over the plenum. In this embodiment of the invention the gas passing upwardly through the screen will rise in the form of bubbles through the slurry, convert the slurry to a foam-like turbulent mass consisting of a multiplicity of rising air bubbles suspended within the slurry. Rising gas which is normally heated will thereby dry the slurry to produce a highly porous dried mat at the left end of the belt section 30a. The resulting dried porous mat can be further treated as described above.

When the process is to be applied for producing tablets, the cells 236 are made to the desired size and can, if necessary, be covered with a foraminous top plate for compressing and molding the upper surface of the tablets.

The invention can also be applied in preparing animal feeds, for example, calf starter can be made in the form of a porous loaf readily dissolved in water or milk. It would have the advantage of a lower packaging cost and increased convenience since a loaf of this type can be wrapped in a conventional manner whereas a powdered product requires complex weighing and bagging machinery.

The invention will be better understood by reference to the following examples.

EXAMPLE I

Lactose is agglomerated in accordance with the invention in the following manner. A spray dried lactose product is deposited on the belt section 30a as a bed having a thickness of about 1 inch. An agglomerating gas is introduced through ducts 76 and 78 having a dry bulb temperature of about 175° F. and a wet bulb temperature of about 135° F. The air velocity through the belt section 30a is about 300 feet per minute. The gas introduced through ducts 70, 72 and 74 has a dry bulb temperature of about 175° F .and a wet bulb temperature of about 165° F. and the velocity of gas through the screen is about 300–350 feet per minute. The gas introduced through duct 121 comprises atmospheric air having a dry bulb temperature of about 70° F. The velocity through the screen in this case is about 50 feet per minute. Sufficient moisture must be added to amorphous lactose to bring the moisture level to about 10.5%. When this level is reached, the lactose will begin to crystallize to the α-monohydrate and/or β-anhydride forms. These forms are less hygroscopic and the removable moisture level will drop to about 2%. When the amorphous form has reached a moisture level of about 10%, the product will be plastic. The high velocity air stream will then convert it to a foamed agglomerate thereby preventing the formation of a tightly compacted, dense product.

EXAMPLE II

A low bloom type gelatin is provided as a granular powder of less than 200 mesh. It had an initial density of 27.6 lbs./cut.ft. and a final density after agglomeration of 13.2 lbs./cu.ft. The agglomerating gas had a dry bulb temperature of 175° F. and a wet bulb temperature of 146° F. The drying section had a temperature of 200° F. dry bulb. The sections were each 18 inches long. The belt speed was 36 inches per minute. Final agglomerates were cold-water soluble.

EXAMPLE III

Pulverulent carboxymethylcellulose of less than 200 mesh was agglomerated with the agglomeration gas at 170° F. dry bulb. The agglomerating gas was saturated with moisture and contained suspended moisture droplets. The drying air temperature was 170° F. dry bulb. The density of the agglomerates was 30% of the initial density. The wetting properties were much better than before treatment.

We claim:

1. A method of agglomerating particulate material comprising the steps of:
    (a) forming from said material a bed having upper and lower surfaces,
    (b) flowing an agglomerating atmosphere upwardly through the bed at a sufficient velocity to place the particulate material making up the bed in a turbulent condition and to elevate the upper surface of the bed and temporarily force said particles in the bed away from one another, the agglomerating atmosphere having the capacity to render the exposed surfaces of the particulate material tacky whereby the particles are bonded together as they make random contact with each other to thereby form a highly porous expanded foam-like mat structure having upper and lower surfaces spaced at a substantially greater distance than the spacing between the upper and lower surfaces of the bed, said mat including a multiplicity of communicating cells distributed randomly therethrough, and
    (c) rigidifying the expanded foam-like mat by removing the tackiness of the particles from which it is composed whereby the mat is rendered substantially self-supporting.

2. The method of claim 1 wherein the rigidified mat is thereafter subdivided into a multiplicity of pieces of substantially smaller size than the mat itself and each of the pieces comprises a highly porous agglomerate.

3. The method according to claim 1 wherein the agglomerating atmosphere comprises a gas containing a condensible liquid adapted to render the surfaces of the particles tacky when the condensible liquid is deposited on the particles within said bed.

4. The method according to claim 1 wherein the agglomerating atmosphere consists entirely of an undiluted condensible liquid in the gaseous state.

5. The method of claim 1 wherein the agglomerating atmosphere comprises a gas heated to a temperature sufficient to soften the surfaces of the particles by incipient thermal fusion of the particles present in the bed whereby the particles are bonded together at their points of contact by the softened material on their surfaces.

6. The process according to claim 1 wherein the expanded foam-like mat is rigidified by cooling the mat to remove the tacky character of the exposed surfaces of the particles thereby rendering the mat friable.

7. The process of claim 1 wherein the mat is rigidified by exposing it to a drying gas for removing the residual tackiness of the exposed surfaces of the particles and solidifying the bonds between the contacting particles.

8. The process according to claim 1 wherein the rigidified bed is exposed to a treating substance whereby at least a portion of the substance is deposited on the particles in the bed for modifying the properties thereof.

9. The process of claim 1 wherein the said bed is formed continuously and is moved progressively from the point of formation through a plurality of treatment zones wherein it is successively exposed to the agglomerating atmosphere, expanded and rigidified and wherein the rigidified mat is then transferred away from the last of said zones.

10. The method according to claim 9 wherein the mat is continuously and progressively broken into pieces after being transferred away from the treatment zones whereby a multiplicity of highly porous agglomerates of a relatively small size are produced.

11. A method of agglomerating particulate material comprising the steps of forming from said material a bed having upper and lower surfaces, forcing an agglomerating atmosphere upwardly through the bed at a sufficient velocity to place the particles of said particulate material in a turbulent condition and temporarily force said particles of particulate material away from one another, the agglomerating atmosphere having the capacity to render the exposed surfaces of the particulate material tacky whereby the particles are bonded together as they make random contact with each other to thereby form a porous expanded foam-like mat structure, rigidifying the mat to remove the tackiness of the particles from which it is composed whereby the mat is rendered friable and subdividing the bed into a plurality of adjacent confined cells each having a predetermined outline whereby a plurality of agglomerated bodies are formed each having a predetermined size and outline.

12. The method according to claim 11 wherein the agglomerating atmosphere comprises a gas containing a condensible liquid adapted to render the surfaces of the particles tacky when deposited thereon within said bed.

13. The method according to claim 11 wherein said cells are confined on their sides thereof but not on the upper surface whereby only the side surfaces of the bodies thus formed have a prescribed and predetermined shape.

14. The method of claim 11 wherein the agglomerating atmosphere comprises a gas heated to a temperature sufficient to produce incipient thermal fusion of the particulate material comprising said bed whereby the particles become bonded together at their points of contact.

15. The process according to claim 11 wherein the expanded foam-like mat is rigidified by cooling the mat to remove the tacky character of the exposed surfaces of the particles thereby causing the mat to become friable.

16. A method of agglomerating a pulverulent material comprising and providing a first foraminous supporting surface, advancing the supporting surface along a substantially horizontal path, causing said particulate material to flow onto said foraminous supporting surface in a first zone to define a bed having a substantially constant thickness throughout the length of said zone, forcing an agglomerating gas upwardly through the foraminous supporting surface and bed in a second zone adjacent to said first zone with sufficient velocity to expand the bed whereby the upper surface of the bed is raised substantially above the initial level of the bed, the agglomerating gas having a capacity to render the surfaces of the particles tacky whereby the particles will become adhered to one another to form a highly porous immobilized expanded mat supported upon the foraminous surface, next exposing the mat thus formed to a rigidifying atmosphere in a third zone to rigidify that mat in substantially its expanded condition and to render the material within the mat friable and thereafter subdividing the material in the mat to provide a multiplicity of agglomerates of a size smaller than the mat.

References Cited

UNITED STATES PATENTS

| | | | |
|---|---|---|---|
| 1,864,769 | 6/1932 | Slidell. | |
| 2,967,109 | 1/1961 | Morgan et al. | 99—206 |
| 2,975,773 | 8/1961 | Gidlow et al. | 264—117 |
| 3,306,958 | 2/1967 | Gidlow | 264—117 |

OTHER REFERENCES

Self-Agglomerating Fluidized-Bed Reduction: B. G. Langston, F. M. Stephens, Jr., Journal of Metals, April 1960, pages 313–316.

ROBERT F. WHITE, Primary Examiner

J. R. HALL, Assistant Examiner

U.S. Cl. X.R.

18—1; 23—313; 99—199; 264—41, 50, 117, 123

UNITED STATES PATENT OFFICE
Certificate
Patent No. 3,471,603　　　　　　　　　　　　　　　　Patented October 7, 1969

Ronald J. Patrick and Philip M. Sautier

Application having been made by Ronald J. Patrick and Philip M. Sautier, the inventors named in the patent above identified, and The Pillsbury Company, Minneapolis, Minn., a corporation of Delaware, the assignee, for the issuance of a certificate under the provisions of Title 35, Section 256, of the United States Code, adding the name of Rolf G. Gidlow as a joint inventor, and a showing and proof of facts satisfying the requirements of the said section having been submitted, it is this 28th day of July 1970, certified that the name of the said Rolf G. Gidlow is hereby added to the said patent as a joint inventor with the said Ronald J. Patrick and Philip M. Sautier.

FRED W. SHERLING
*Associate Solicitor.*